(12) United States Patent
Clark

(10) Patent No.: US 11,153,413 B2
(45) Date of Patent: Oct. 19, 2021

(54) DISTRIBUTED STATE RECOVERY IN A SYSTEM HAVING DYNAMIC RECONFIGURATION OF PARTICIPATING NODES

(71) Applicant: ARRIS Enterprises LLC, Suwanee, GA (US)

(72) Inventor: Dan Leverett Clark, Portland, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/658,424

(22) Filed: Oct. 21, 2019

(65) Prior Publication Data
US 2020/0128107 A1 Apr. 23, 2020

Related U.S. Application Data

(60) Provisional application No. 62/747,867, filed on Oct. 19, 2018.

(51) Int. Cl.
*H04L 29/06* (2006.01)
*H04L 29/08* (2006.01)
(Continued)

(52) U.S. Cl.
CPC .......... *H04L 67/42* (2013.01); *H04L 9/0643* (2013.01); *H04L 12/5601* (2013.01);
(Continued)

(58) Field of Classification Search
CPC ......... H04L 67/14; H04L 67/16; H04L 67/18; H04L 67/22; H04L 67/145; H04L 67/146;
(Continued)

(56) References Cited

U.S. PATENT DOCUMENTS 7,668,195 B2 2/2010 Stone
8,458,340 B2 * 6/2013 Erickson ............... H04L 67/148
709/227

(Continued)

OTHER PUBLICATIONS

PCT International Search Report & Written Opinion, Re: Application No. PCT/US2019/057234, dated Jan. 16, 2020.
(Continued)

*Primary Examiner* — Philip C Lee
(74) *Attorney, Agent, or Firm* — Chernoff, Vilhauer, McClung & Stenzel, LLP

(57) ABSTRACT

A method for obtaining previously stored session state data for a session between a system having a plurality of nodes and a client device includes obtaining a session identifier specifying the session and hashing the session identifier. A currently valid hash map is searched. The hash map maps a hash of the session identifier to the nodes for a current system configuration. The search is performed to identify a system node on which the session state data for the session is stored. If the session state data is not located using the currently valid hash map, at least one earlier generation hash map that is valid for a previous configuration of the system is searched. Upon identifying the system node on which the session state data is stored, the session state data from the system node is retrieved. The session state data is used to establish the session.

20 Claims, 5 Drawing Sheets

(51) Int. Cl.
  *H04L 9/06* (2006.01)
  *H04L 12/26* (2006.01)
  *H04L 12/54* (2013.01)
  *H04L 12/70* (2013.01)

(52) U.S. Cl.
  CPC .......... *H04L 43/067* (2013.01); *H04L 63/166* (2013.01); *H04L 63/20* (2013.01); *H04L 67/14* (2013.01); *H04L 2012/5635* (2013.01)

(58) Field of Classification Search
  CPC .. H04L 67/148; H04L 65/1083; H04L 9/0643
  See application file for complete search history.

(56) References Cited

U.S. PATENT DOCUMENTS

| | | | |
|---|---|---|---|
| 8,938,469 B1* | 1/2015 | Keen | H04L 45/7453 707/769 |
| 9,621,399 B1* | 4/2017 | Parakh | H04L 29/06047 |
| 9,648,359 B2 | 5/2017 | Romrell | |
| 2003/0208511 A1* | 11/2003 | Earl | G06F 16/275 |
| 2008/0244667 A1 | 10/2008 | Osborne | |
| 2010/0086020 A1 | 4/2010 | Schlack | |
| 2010/0106512 A1* | 4/2010 | Hyndman | G06Q 10/10 705/1.1 |
| 2010/0185680 A1* | 7/2010 | Gilboa | H04L 63/1441 707/802 |
| 2012/0137290 A1* | 5/2012 | Berg | G06F 12/0284 718/1 |
| 2012/0254447 A1* | 10/2012 | Popescu | H04L 63/12 709/227 |
| 2013/0132986 A1 | 5/2013 | Mack | |
| 2015/0067722 A1 | 3/2015 | Bjordammen | |
| 2016/0308958 A1* | 10/2016 | Navali | H04L 65/601 |
| 2017/0116135 A1* | 4/2017 | Sundaravaradan | G06F 12/0842 |
| 2018/0184143 A1 | 6/2018 | Davis | |
| 2018/0359502 A1 | 12/2018 | Romwell | |
| 2020/0004861 A1* | 1/2020 | Bastawala | H04L 67/141 |
| 2020/0084269 A1* | 3/2020 | Husar | H04L 45/7453 |

OTHER PUBLICATIONS

International Preliminary Report on Patentability Re: Application No. PCT/US2019/057234 (dated Apr. 29, 2021).

* cited by examiner

DISTRIBUTED STATE RECOVERY IN A SYSTEM HAVING DYNAMIC RECONFIGURATION OF PARTICIPATING NODES

CROSS REFERENCE TO RELATED APPLICATION

This application claims the benefit of U.S. Provisional Application Ser. No. 62/747,867, filed Oct. 18, 2018, the contents of which are incorporated herein by reference.

BACKGROUND

Multimedia delivery systems, such as those used by cable operators, content originators, over-the-top content providers, and so forth, deliver multimedia video content, software updates, webpages, and other information to client devices. Frequently, advertising is inserted into the multimedia content. Multimedia content may be delivered to consumers as adaptive bitrate (ABR) streams. In this case, a manifest manipulator such as a manifest delivery controller (MDC) can perform dynamic targeted advertising in which unique advertisement decisions are made for each streaming session as placement opportunities are discovered. Such targeted advertising represents just one way in which ABR streaming sessions may be customized for individual client devices or groups of client devices.

In order to meet the demands imposed when a large number of sessions are occurring simultaneously, the services used to customize those sessions, such as those provided by an MDC, for example, are scaled up by replicating the services across multiple servers. Providing resilience to network changes, application restarts and device changes associated with the session may cause a session that has been interrupted to be restarted when a client request is received on a different server from the one that previously supported the session. In order to restore the session the session state information needs to be stored and made accessible to the different servers that might ultimately provide services to the restored session. Thus, it is important to be able to determine where the session state data has been stored across a distributed system in order to restore the session. The number of servers or other resources delivering services to client devices may expand and contract in order to handle changes in the load caused by natural usage characteristics, special demands or events requiring additional support, such as a popular news or sporting event. Providing a means of dynamically resizing the resources of the system while still maintaining a fully distributed mechanism for locating the session state data poses challenges.

SUMMARY

In accordance with one aspect of the techniques described herein, a method is provided for resuming a session that has been interrupted between a system having a plurality of nodes and a client device. Subsequent to interruption of service in a session between a first node and a client in which the first node delivers a service to the client device, a session resume request is received from the client at a second node in the system. The session resume request includes information allowing the second node to obtain a session identifier identifying or otherwise specifying the session. The session identifier is hashed and a currently valid hash map is searched. The hash map maps a hash of the session identifier to the nodes in the system for a current system configuration. The search is performed to identify a system node on which the session state data for the session is stored. If the session state data is not located using the currently valid hash map, at least one earlier generation hash map that is valid for a previous configuration of the system is searched. Upon identifying the system node on which the session state data is stored, the session state data is retrieved from the system node. The session state data is used so that the second node is able to resume delivery of the service to the client device.

In accordance with another aspect of the techniques described herein, a computer-readable medium having computer executable instructions is provided for implementing a method for obtaining previously stored session state data for a session between a system having a plurality of nodes and a client device. The method includes obtaining a session identifier identifying or otherwise specifying the session and hashing the session identifier. A currently valid hash map is searched. The hash map maps a hash of the session identifier to the nodes in the system for a current system configuration. The search is performed to identify a system node on which the session state data for the session is stored. If the session state data is not located using the currently valid hash map, at least one earlier generation hash map that is valid for a previous configuration of the system is searched. Upon identifying the system node on which the session state data is stored, the session state data from the system node is retrieved. The session state data is used to establish the session.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Adaptive bit rate streaming is a technique for streaming multimedia where the source content is encoded at multiple bit rates. It is based on a series of short progressive content files applicable to the delivery of both live and on demand content. Adaptive bit rate streaming works by breaking the overall media stream into a sequence of small file downloads, each download loading one short segment, or chunk, of an overall potentially unbounded content stream.

As used herein, a segment or chunk is a small file containing a short duration section of video (typically 2 to 10 seconds but can be as short as a single frame in some implementations) along with associated audio and other data. Sometimes, the associated audio and other data are in their own small files, separate from the video files and requested and processed by the ABR client(s) where they are reassembled into a rendition of the original content. Adaptive streaming may use, for instance, the Hypertext Transfer Protocol (HTTP) as the transport protocol for these video segments. For example, ' segment' or ' segment files' may be short sections of media retrieved in an HTTP request by an ABR client. In some cases these segments may be standalone files, or may be sections (i.e. byte ranges) of one much larger file. For simplicity the term 'segment' or 'chunk' is used to refer to both of these cases (many small files or fewer large files).

Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

Figure 1:
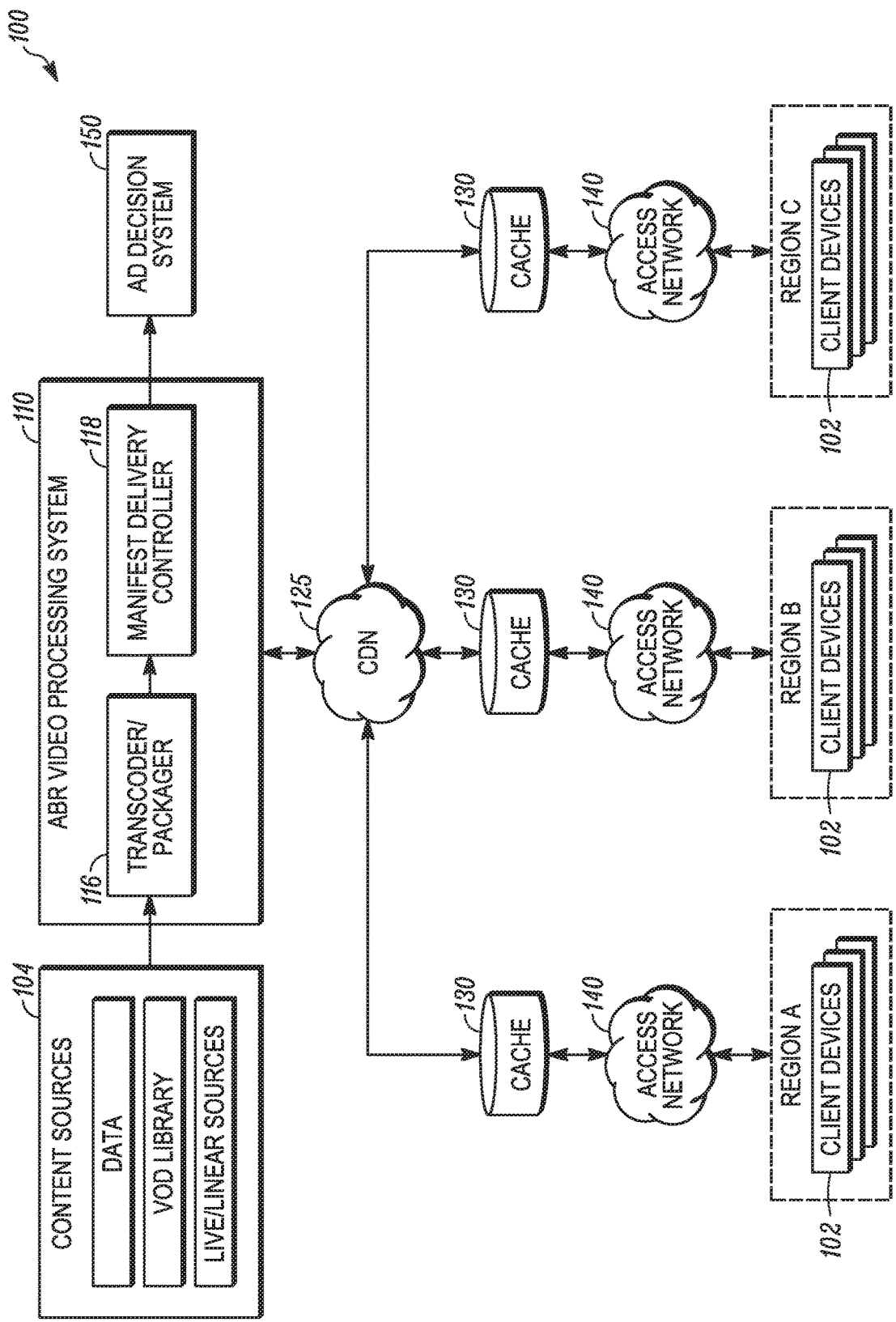
FIG. 1 shows one example of an operating environment in which the techniques, systems and devices described herein may operate.

FIG. 1 shows one example of an operating environment in which the techniques, systems and devices described herein may operate. In particular, FIG. 1 depicts a high-level functional block diagram of a representative adaptive bit rate system 100 that delivers content to adaptive bit rate client devices 102. An adaptive bit rate client device 102 is a client device capable of providing streaming playback by requesting an appropriate series of segments from an adaptive bit rate system. The ABR client devices 102 associated with users or subscribers may include a wide range of devices, including, without limitation, digital televisions, set top boxes (STBs), digital media players, mobile communication devices (e.g., smartphones), video gaming devices, video game consoles, video teleconferencing devices, and the like.

The content made available to the adaptive bit rate system 100 may originate from various content sources represented by content source 104, which may provide content such as live or linear content, VOD content and Internet-based or over-the-top (OTT) content such as data, images, graphics and the like. The content is provided to an ABR video processing system 115 that is responsible for ingesting the content in its native format (e.g., MPEG, HTML5, JPEG, etc.) and processing it as necessary so that it can be transcoded and packaged. The ABR video processing system 115 includes the transcoders and packagers 116 that are responsible for preparing individual adaptive bit rate streams. A transcoder/packager 116 is designed to encode, then fragment the media files into segments and to encapsulate those files in a container expected by the particular type of adaptive bit rate client. The adaptive bit rate segments are available at different bit rates, where the segment boundaries are aligned across the different bit rates so that clients can switch between bit rates seamlessly at the segment boundaries.

Along with the delivery of media, the ABR video processing system 115 also includes a manifest manipulator such as a manifest delivery controller (MDC) 118 that creates the manifest files for each type of adaptive bit rate streaming protocol that is employed. In adaptive bit rate protocols, the manifest files generated may include a main or variant manifest and a profile or playlist manifest. The main manifest describes the various formats (resolution, bit rate, codec, etc.) that are available for a given asset or content stream. For each format, a corresponding profile manifest may be provided. The profile manifest identifies the media file segments that are available to the client. The ABR client determines which format the client desires, as listed in the main manifest, finds the corresponding profile manifest and location, and then retrieves media segments referenced in the profile manifest.

The individual adaptive bit rate streams are typically posted to an HTTP origin server (not shown) or the like so that they can be accessed by the client devices 102 over a suitable content delivery network (CDN) 125, which may be in communication with various edge caches 130. In some cases the edge caches 130 are in turn in communication with one or more client devices 102 in one or more regions through one or more access networks 140 that each serve a designated region. By way of a non-limiting example, FIG. 1 depicts an example of the data center 110 in communication with three regions A, B and C. However, the central data center 110 can be in communication with any desired number of regions. CDN 125 and access networks 140 may comprise any suitable network or combination of networks including, without limitation, IP networks, hybrid fiber-coax (HFC) networks, and the like.

It should be noted that the various systems and components of the adaptive bit rate system 100 shown in FIG. 1 may be in any suitable location or locations. To the extent they are not co-located, they may communicate over one or more networks such as an IP CDN.

As previously mentioned, the manifests provided by the MDC 118 includes links for the segments associated with the multimedia content to be retrieved by the client devices. In addition, the manifest may include placeholders that denote insertion points in which the MDC 118 can insert alternative content such as advertisements. When a placeholder is detected, the MDC 118 may retrieve the links for the alternative content from different sources, such as an ad decision system (e.g., ad decision system 150 shown in FIG. 1) in the case of advertisements. The ADS may determine the ad that is to be inserted into the manifest at the insertion point denoted by the placeholder and provide the MDC 118 with the appropriate links to the selected ad(s), which the MDC 118 in turn will incorporate into the manifest. Communication between the MDC 118 and the ADS use protocols such as the Society of Cable Telecommunications Engineers (SCTE) 130 and the IAB Video Ad Serving Template (VAST), for example, to retrieve the determination of the appropriate advertisement that needs to be spliced into the manifest.

Figure 2:
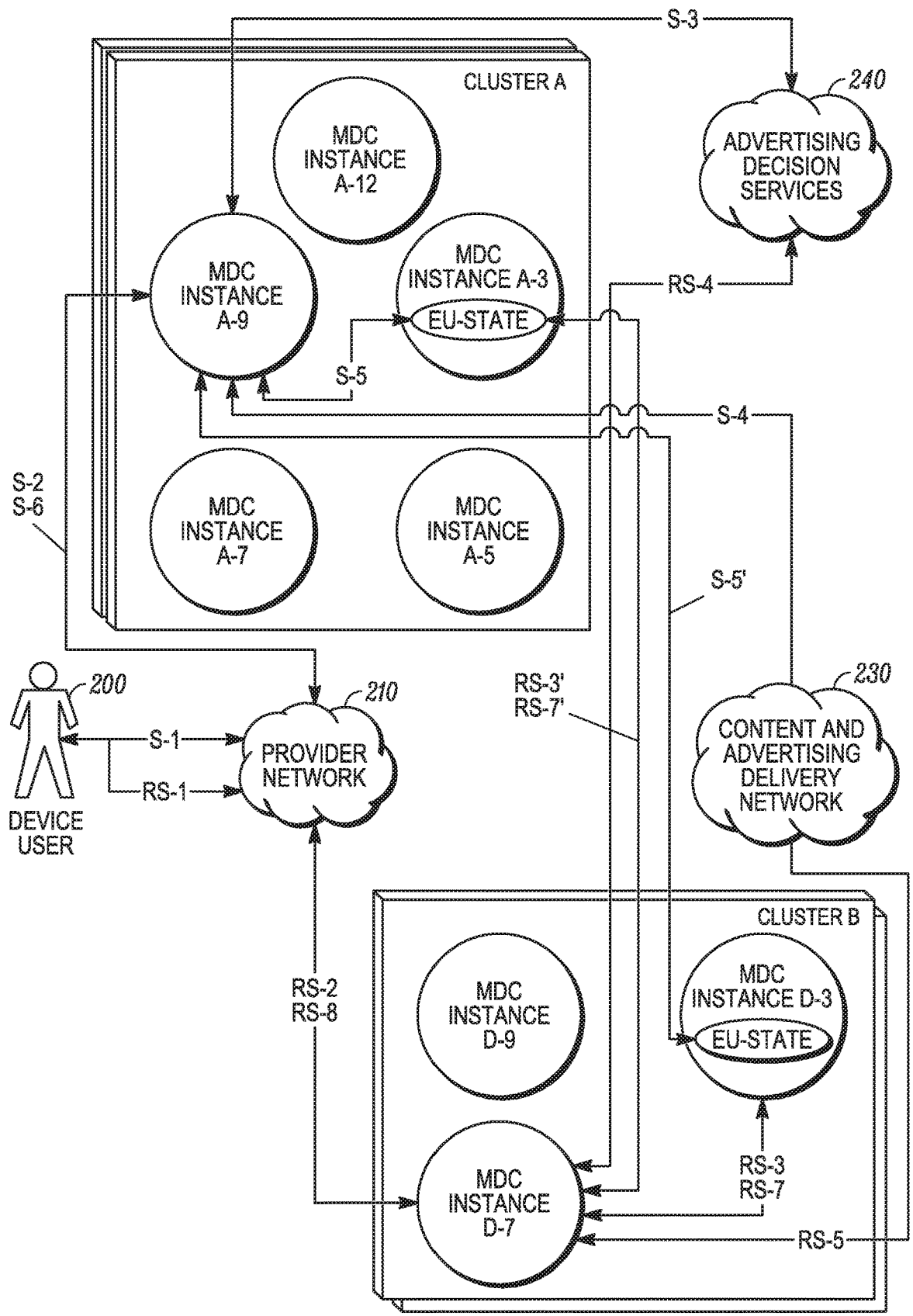
FIG. 2 is a simplified functional block diagram of a client device that receives adaptive bit rate (ABR) content over a communications network.

As also previously mentioned, resources that deliver services to client devices, such as those services delivered by the MDC 118 during an ABR streaming session, need to be scaled up both to meet increases in demand and to provide network resiliency. In the case of an MDC, for instance, this may be accomplished by providing a distributed arrangement of MDC instances. This is illustrated in FIG. 2, which shows a simplified functional block diagram of a client device 200 that receives ABR content over a communications network 210. The client device sends a request to establish an ABR streaming session over the communication network. The request may be received by any of a series MDC instances. In this particular example the MDC instances are divided into two or more clusters, represented by cluster A and cluster D, each of which may include any suitable number of MDC instances. Of course, more generally, the MDC instances may be arranged into any suitable groupings, or even no groupings at all. In the example of FIG. 2 cluster A illustratively includes MDC instances A3, A5, A7, A9 and A12 and cluster D illustratively includes MDC instances D3, D7 and D9.

FIG. 2 will be used to illustrate how a streaming session, which is established for client device 200 by receiving manifests from one MDC instance, is subsequently interrupted and then resumed using a different MDC instance. The flow of communication events between entities for establishing the streaming session will be illustrated by steps S1-S5 and the steps of restoring the streaming session will be subsequently illustrated by steps RS1-RS8.

At S1 the end user's client device 200 accessing the system makes a request for receiving streaming content over a service provider network 210. The service provider network routes the request at S2 to an instance of the MDC, which in this example happens to be MDC instance A9. The MDC instance A9 periodically retrieves the appropriate URLs for the requested content and for other placement opportunities such as advertisements. For example, at S3 the MDC instance A9 identifies a placement opportunity for an ad and contacts ad decision service 240 to request an ad decision for a suitable ad that should be inserted. The MDC instance A9 then retrieves the URLs for that ad at S4 from content and advertisement delivery network 230. In this way the MDC instance A9 can stitch together a manifest that provides a seamless session for the client device 200. At S5 the necessary shards of session state data are periodically saved on behalf of the client device 200 by the MDC instance A9 on another MDC instance, which in this case happens to be MDC instances A3 and D3. In FIG. 2 the saved session state data is denoted as end user (eu) state data.

The manner in which a suitable MDC instance is chosen for storing the session state data in accordance with the distributed cache mechanism will be described below. In accordance with a resiliency policy, at optional step S5' one or more copies of the session state data may also be stored at other locations in a manner that will also be described below. The session state data that is saved may be any state data needed to restore the session for the user so that the transition between sessions appears seamless to the user. Accordingly, the session state data will generally include, by way of example, at least an identifier of the content being streamed to the client device and a time stamp or the like indicating the most recent content segments that have been fetched by the client device. Of course, the session state data also may be saved through information returned to the client device 200 using mechanisms such as browser cookies, although some client devices may not support appropriately caching and returning the data using these mechanisms.

If the streaming session is interrupted for any reason, the client device attempts to re-establish the session by sending a request over the service provider network 210 at RS1. In one example, the session may be interrupted because the end user switches to a different client device or because of a network interruption. In this case the request happens to be routed at RS2 to a different MDC instance, which in this example is MDC instance D7 in MDC cluster D. The routing of the session resume request to a different MDC instance could be the result of a change in the type of client device used, a change in the network routing infrastructure or policies, or a failure of service provided by the MDC cluster A generally or the MDC instance A9 specifically. The session resume request in general may arrive at the original cluster or a different cluster, and on the original or a new MDC instance. Since MDC instance D7 is initially not familiar with the context of the session, it determines the location of the session state data using the distributed cache mechanism described in more detail below and contacts that location at RS3 to obtain the session state data, which is sufficiently up to date to restore operation of the session. As illustrated at RS3', MDC instance D7 may need to look in multiple locations (D3 and A3) for the session state data based on the current state of the MDC instances. The resiliency policy may dictate the order in which the different locations will be examined. For instance, the policy may dictate that any locations storing session state data in the local cluster should be examined before other clusters.

As illustrated at RS4, MDC instance D7 may periodically obtain advertising decisions from one of the multiple ad decision services 240. The MDC instance D7 periodically retrieves the appropriate URLs for the requested content and for the advertisements at RS5 from content and advertisement delivery network 230. After outputting telemetry, log and verification data, the session state data is periodically stored at RS7, in this case to A3 and D3, to ensure that it remains current. At optional step RS7' copies of the session state data may also be stored in accordance with the resiliency policy at one or more locations to ensure recovery when faced with various failure and re-routing scenarios. The manifest is delivered by MDC instance D7 to the client device 200 at RS8 for seamless operation of the session and continuity of data flow.

Figure 3:
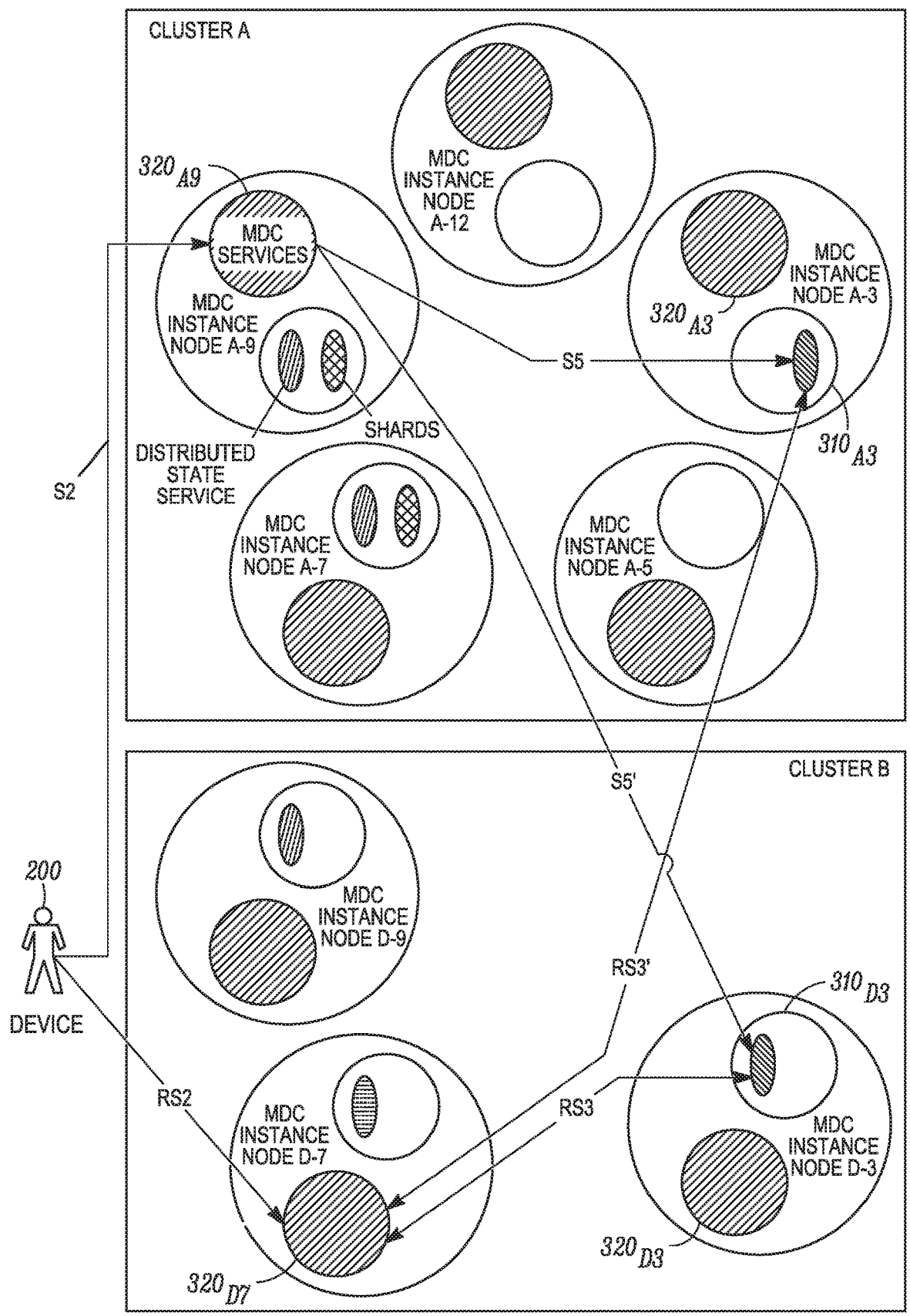
FIG. 3 shows the clusters of the various manifest delivery controller (MDC) instances of FIG. 2 to illustrate how a session may be resumed across different MDC clusters.

As indicated at steps S5, S5', RS3 and RS3' in FIG. 2 above, session state data needs to be periodically stored at and retrieved from various locations by the MDC instances. This process is further illustrated in FIG. 3, which shows the client device 200, clusters A and D of MDC instances A and D and the steps S2, S5, S5' of FIG. 2, during which the initial session is established and session state data is stored in memories $310_{A3}$ and $310_{D3}$, which may be cache daemons or the like. FIG. 3 also shows the restoration of the session during which the session resume request is received at step RS2 by MDC instance D7, which attempts to retrieve the session state data at steps RS3 and RS 3'. FIG. 3 also shows that each MDC instance includes various components that deliver the streaming services to the client devices. These components are represented in FIG. 3 by MDC services 320, such as MDC services $320_{A9}$ associated with MDC instance A9 and MDC services $320_{D7}$ associated with MDC instance D7.

As previously mentioned, it is desirable to store the session state data in a distributed manner using a mechanism that can be deterministically scaled in response to changes in load demands and other requirements. Importantly, the distributed mechanism should not require a centralized mechanism to determine the location at which session state date should be stored since it can lead to bottlenecks and a single point of failure. Thus, it would be desirable if the MDC instances could deterministically identify the appropriate location(s) at which session state data should be stored and from which session state data should be retrieved. Since this mechanism is to employ an algorithm or method that is deterministic and known to all MDC instances, each and every MDC instance in the system can determine where session state data is located without needing information from a centralized mechanism or another MDC instance. In this way, for example, when an MDC instance needs to restore a session that it did not previously service, it can determine on its own where the session state data is stored.

In accordance with the techniques described herein, the location of the session state data is based on the unique session ID that is assigned to the particular ABR streaming session. In particular, the algorithm shared by all MDC instances uses a distributed policy to shard the state to a set of MDC instances using the unique identifier assigned to the session. Since all MDC instances share a common algorithm but not a common value of centralized key, the location of the session state data can be found with a constant (c) order search O(c) where the algorithm scales independently of the number of MDC instances and client devices, but is instead dictated by the number of copies of the session state data that is to be stored in accordance with the resiliency policy.

In general, the system assigns each ABR streaming session a unique session ID such as a universally unique identifier (UUID) that is for all practical purposes unique within the given system over a specified lifetime. An example of a session ID might be 64616e21-4d4c-4a4c-424f-636c61726b2e. Techniques in which unique session identifiers are assigned to users who request sessions are well-known and need not be discussed in detail. In one particular embodiment, the algorithm uses the session ID to write the session state data to a specified number of locations based on the hash of the session ID, which is correlated to the MDC instances in the system. Using the hash of the session ID allows a numerical mapping to a smaller cardinality to be performed. In this way the session IDs are mapped from a large numerical space of UUIDs to a smaller space of integers that corresponds to the indices of the MDCs themselves.

In one particular embodiment, a library may be added to the MDC instances that provides a daemon or other process with the ability to perform a set of operations (put/get/del) in both synchronous and asynchronous calls. The library implements the algorithm for identifying the set of MDC instances where the session state data is to be written based on the hash of the unique identifier (e.g., the UUID) associated with the session. If this unique session identifier is received by any other MDC instance in the system as a part of a session request, the MDC instance determines the hash value of that session identifier (the seed of the hash is constant across the product so that the UUID always hashes to the same value) to locate the previously stored session state data using a hash map that maps the hash of the session identifier to the index of the MDC instance(s) on which the session state data is to be stored. Thus, the same MDC instances are identified in every case and the previously stored session state data can be found by searching through a list of those identified MDC instances, with the number of MDC instances on that list corresponding to the number of copies of the session state data that have been retained and the selection of clusters used to store cross cluster data.

The distributed storage mechanism described herein provides a number of advantages over the conventional technique employed for storing ABR streaming session state data, which employs a set of 'cluster manager' nodes which are sent a message each time a session is received at an MDC instance that did not previously handle the session. The centralized authority would then lookup the session state data and return the data to the MDC instance that needs to restore the session. A centralized approach suffers from several maladies and introduces additional constraints. First, the identifier used for the state is an integer index into a fixed data structure shared between two daemons that requires the state to be frequently copied between the primary and backup server. Second the backup server does not actually service any timely decision making, but merely handles the load of copying state. Finally, if a session failed to a different cluster, the state could not be recovered across clusters. All of these limitations are overcome with the decentralized distributed state approach described herein.

By removing a centralized, replicated 'cluster manager' the techniques described herein allow the number of sessions to be scaled linearly with the addition of resources (e.g., virtual machines or computer container pods). As each resource is added it may be coupled with a commensurate daemon that provides the storage mechanism appropriately sized to handle an additional portion of the load. By segmenting resources into groups (e.g., clusters) the replication policy can be managed to line up with the routing policy for client devices administered by the customer using the load balancing mechanism that is used to route the client device traffic to different back end server resources. Simulations have demonstrated that scaling to millions of client devices uses fewer computing resources and provides a more expedient and reliable restoration of services when client device requests are re-routed between server endpoints by a load balancing application.

The techniques described above all assume that the system of MDC instances or other system resources is fixed and unchanging. As a consequence, the hash map table mapping the hash of the session identifier to the index of the MDC instance on which the session state data is stored is also assumed to be fixed and unchanging. However, the number of MDC instances or other resources and their distribution (e.g., network topology) may change over time for a variety of reasons. For example, as the load changes, system resources (e.g., MDC instances) may be changed to accommodate the load changes. In this way, for instance, as the number of session requests increases the number of MDC instances may be increased, and visa versa. That is, MDC instances may be added or deleted over time. The system may change for other reasons as well, such as when performing system maintenance or other tasks on MDC instances or other system resources. As a consequence, the assumption that there is a fixed mapping between the large cardinality of session identifiers and the small cardinality of resources that service those sessions will no longer be valid. Accordingly, a problem may arise when system resources fluctuate impacting the cardinality of the resources saved during one time period, yet it is necessary to locate the session data during a subsequent time period with a different resource allocation.

This problem can be illustrated with a simple example. Assume a system having two MDC instances or other resources denoted by the integers "0" and "1", respectively. Further assume that session state data needs to be stored or retrieved for sessions identified by an alphabetic character, say session identifiers "a", "b", "c" and "d," respectively. The mapping between the session identifiers and the MDC instances may be performed using the hash map shown in Table 1. That is, the hash of session identifier "a" is mapped to node 0, the hash of session identifier "b" is mapped to node 1, the hash of session identifier "c" is mapped to node 0 and the hash of session identifier "d" is mapped to node 1.

TABLE 1

| HASH OF SESSION IDENTIFIER | NODE |
| --- | --- |
| a | 0 |
| b | 1 |
| c | 0 |
| d | 1 |

Now, assume that the system changes to increase system resources and as a consequence the number of MDC instances increases from two to four. Accordingly, the system now has four MDC instances or other resources denoted by the integers "0," "1," "2" and "3," respectively. Further assume that session resume requests are received with the same four session identifiers as in the example above. That is, session resume requests are received for session identifiers "a", "b", "c" and "d," respectively. The new hash map between the session identifiers and the MDC instances in the reconfigured is shown in Table 2. In this case the hash of session identifier "a" is mapped to node 0, the hash of session identifier "b" is mapped to node 1, the hash of session identifier "c" is mapped to node 2 and the hash of session identifier "d" is mapped to node 3.

TABLE 2

| HASH OF SESSION IDENTIFIER | NODE |
|---|---|
| a | 0 |
| b | 1 |
| c | 2 |
| d | 3 |

Thus, if the MDC instance receiving the session resume request "c" uses the current hash map (Table 2), it will attempt to locate the session state data on MDC instance 2. Likewise, if the MDC instance receiving session resume request "d" uses the current hash map, it will attempt to locate the session state data on MDC instance "d". Of course, the session state data for sessions "c" and "d" will not be found on MDC instances 2 and 3, respectively, because those MDC instances were not even employed in the system when the session state data for session "c" and "d" were last stored. This problem arises because the MDC instance receiving the session resume request is using the current hash map and not the hash map that was valid at the time the session state data was last stored.

This problem may be addressed by assigning a generation identifier to each hash map associated with a particular configuration state of the system. When the configuration of MDC instances in the system undergoes a change, a new hash map is generated and assigned a new generation identifier. When session state data is saved, it is always saved using the hash map that is current at that time. However, when previously stored session state data is to be retrieved, the read request performed by the MDC instance will first attempt to locate the data using the current hash map. If that is unsuccessful or the timestamp is too old, the MDC instance will attempt to locate the data using the immediately preceding hash map. This process may continue by sequentially searching previous hash maps until the session state data is located or the timeframe of maps is beyond the bounds for valid data retrieval.

Thus, in the example presented above, any session state data that is to be saved after the system is reconfigured to increase the number of MDC instances from two to four will be saved to an MDC instance that is chosen using the hash map in Table 2. However, any session resume requests that needs to retrieve previously stored session state data will first attempt to find it using the hash map in Table 2 and, if that fails, it will then attempt to find it using the hash map in Table 1. If the data is not found using that hash map, a still earlier generation hash map may be used.

This approach is particularly advantageous in systems such as the ABR system described herein, where reconfiguration of system resources (MDC instances) occurs on a relatively slow time scale relative to the lifetime of the session state data. Since the session state data generally has a finite TTL, hash maps will expire after the longest TTL for any of the data has expired. Accordingly, only a constrained finite number of generations of the hash map will need to be searched to locate the stored session state data.

In one particular embodiment, the hash maps may be stored in a first-in, first-out queue. Each queue entry will be associated with a particular generation identifier, a timestamp and the maximum TTL associated with any data written using that queue entry. All write operations performed to store session state data will use only the top-level hash map. On the other hand, read operations performed to locate session state data will proceed by searching through each earlier generation of hash maps in the queue from top to bottom, where the likelihood that a previous generation will need to be searched continuously diminishes with each older generation.

It should be noted that for simplicity of illustration in the examples depicted above the session state data is stored in its entirety at each location. That is, the session state data has not been sharded and thus has a shard count of 1. More generally, each copy of the session state data that is to be stored may be sharded with any desired shard count greater than one. The individual shards of the session state data may or may not be co-located. Although the shards generally may be co-located for a given session, they nevertheless may be periodically saved at different time intervals and with different times to live (TTLs). However, it should be emphasized that the shards need not be co-located.

While the techniques described herein have been described as a mechanism for storing ABR streaming session data during sessions provided to client devices by MDC instances, these techniques are more generally applicable to any set of nodes (e.g., MDC instances or other server resources) that deliver one or more services (e.g., ABR streaming content) to devices in which state data (e.g., ABR streaming session data) needs to be saved. For instance, in one alternative embodiment presented by way of example only and not as a limitation on the techniques described herein, the system may be a vision system having part identifiers, which serve as nodes that deliver services such as an assessment of the quality of parts. In this case the session state data that needs to be periodically saved may include a label, the time of labeling and the presence or absence of a part.

Figure 4:
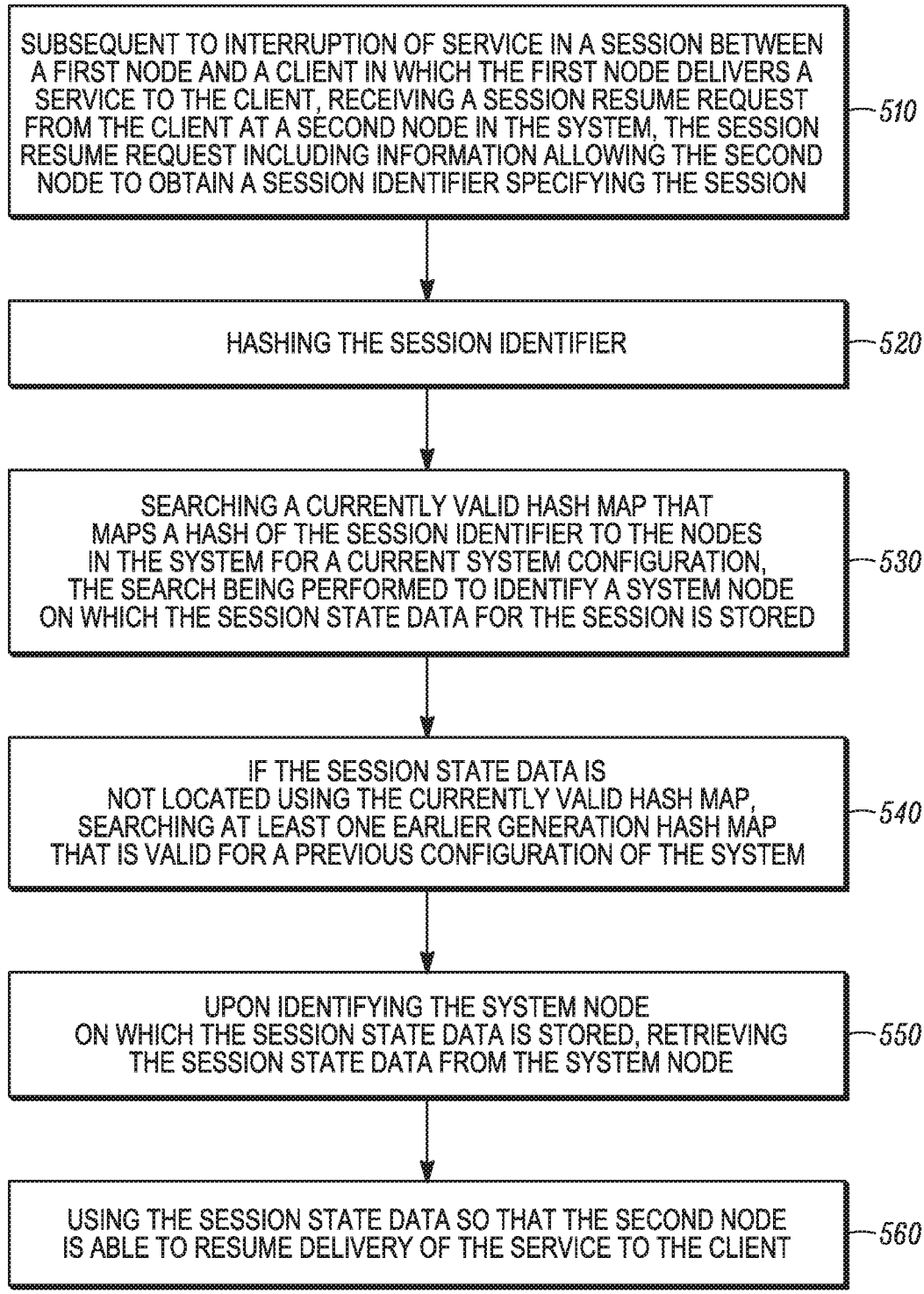
FIG. 4 is a flowchart illustrating one example of a method for resuming a session that has been interrupted between a system having a plurality of nodes and a client device.

FIG. 4 is a flowchart illustrating one example of a method for resuming a session that has been interrupted between a system having a plurality of nodes and a client device. Subsequent to interruption of service in a session between a first node and a client device in which the first node delivers a service to the client, a session resume request is received at block 510 from the client at a second node in the system. The session resume request includes information allowing the second node to obtain a session identifier identifying the session. The session identifier is hashed at block 520. A currently valid hash map is searched at block 530. The hash map maps a hash of the session identifier to the nodes in the system for a current system configuration. The search is performed to identify a system node on which the session state data for the session is stored. If the session state data is not located using the currently valid hash map, at least one earlier generation hash map that is valid for a previous configuration of the system is searched at block 540. Upon identifying the system node on which the session state data is stored, the session state data is retrieved from the system node at block 550. The session state data is used at block 560 so that the second node is able to resume delivery of the service to the client.

Figure 5:
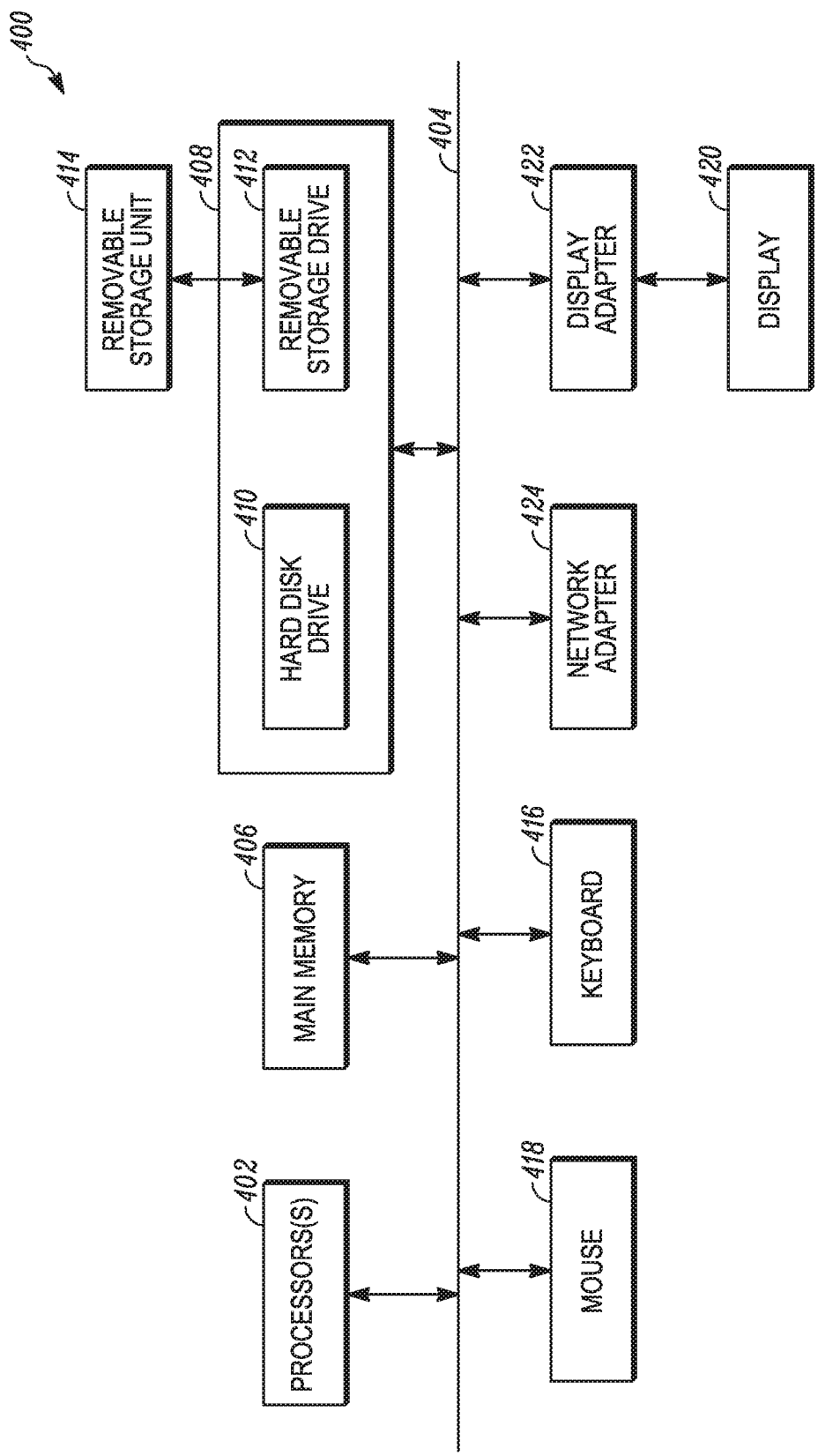
FIG. 5 illustrates a block diagram of one example of a computing apparatus that may be configured to implement or execute one or more of the processes performed by any of the various devices shown herein.

FIG. 5 illustrates a block diagram of one example of a computing apparatus 400 that may be configured to implement or execute one or more of the processes performed by any of the various devices shown herein, including but not limited to the various MDC instances. It should be understood that the illustration of the computing apparatus 400 is a generalized illustration and that the computing apparatus 400 may include additional components and that some of the components described may be removed and/or modified without departing from a scope of the computing apparatus 400.

The computing apparatus 400 includes a processor 402 that may implement or execute some or all of the steps described in the methods described herein. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more electronic, magnetic and/or optical mass storage devices 410 and/or a removable storage drive 412, where a copy of the program code for one or more of the processes described herein may be stored. The removable storage drive 412 reads from and/or writes to a removable storage unit 414 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. All functions performed by the various components, modules, engines, systems, apparatus, interfaces or the like may be collectively performed by a single processor or each component, module, engine, system, apparatus, interface or the like may have a separate processor.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein may be combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method for resuming a prior session that has been interrupted between a system having a plurality of nodes and a client device, the prior session having associated session state data, the method comprising:
   subsequent to interruption of service in the prior session between a first node and a client device in which the first node delivers a service to the client device, receiving a session resume request from the client device at a second node in the system, the session resume request including information allowing the second node to obtain a session identifier specifying the prior session;
   hashing the session identifier;
   searching a currently valid hash map that maps a hash of the session identifier to the nodes in the system for a current system configuration, the search being performed to identify a system node on which the session state data for the prior session is stored;
   if the session state data is not located using the currently valid hash map, searching at least one earlier generation hash map that is valid for a previous configuration of the system;
   upon identifying the system node on which the session state data is stored, retrieving the session state data from the system node; and
   using the session state data so that the second node is able to resume delivery of the service to the client device.

2. The method of claim 1, wherein searching said at least one earlier generation includes sequentially searching earlier generation hash maps from the currently valid hash map back through previous generations of hash maps until the session state data is located.

3. The method of claim 1, wherein the second node is currently delivering another session to another client device and further comprising storing session state data for said another session using the currently valid hash map.

4. The method of claim 2, wherein previous generations of the hash map expire and no longer need to searched after expiration of a time-to-live (TTL) for any stored session state data.

5. The method of claim 1, wherein the session identifier is a universally unique identifier (UUID) that is unique within the system for no more than a specified period of time.

6. The method of claim 1, wherein the session state data includes sufficient data for the second node to resume the session.

7. The method of claim 1, wherein the nodes in the system include server resources.

8. The method of claim 1, wherein the system is a system for delivering ABR streaming content to the client device, each of the nodes of the system including an instance of a manifest manipulator delivering ABR manifests to the client device, wherein the service being delivered to the client device includes delivery of ABR streaming content to the client device.

9. The method of claim 1, wherein each generation of the hash maps is assigned a generation identifier and a time-stamp.

10. The method of claim 1, wherein the plurality of nodes are grouped into different clusters of nodes and identifying the system node in the system on which the session state data is stored further comprises identifying the second node based in part on a previously established system policy concerning the clusters of nodes.

11. The method of claim 10, wherein the established system policy dictates that attempts to retrieve stored session state data first attempt to retrieve the stored session state data from a node in a cluster in which the first node is located.

12. The method of claim 1, wherein the session state data has a shard count greater than 1.

13. The method of claim 12, wherein identifying the system node includes identifying two or more of the plurality of nodes on each of which a different shard of the session state data is saved and further comprising obtaining each of the different shards of the session state data from the two or more nodes.

14. The method of claim 1, wherein each of the nodes includes a server resource that deliver services to client devices.

15. A computer-readable storage medium having computer executable instructions for implementing a method for obtaining previously stored session state data for a session between a system having a plurality of nodes and a client device, the method comprising;
  obtaining a session identifier specifying the session;
  hashing the session identifier;
  searching a currently valid hash map that maps a hash of the session identifier to the nodes in the system for a current system configuration, the search being performed to identify a system node on which the session state data for the session is stored;
  if the session state data is not located using the currently valid hash map, searching at least one earlier generation hash map that is valid for a previous configuration of the system;
  upon identifying the system node on which the session state data is stored, retrieving the session state data from the system node; and
  using the session state data to establish the session.

16. The computer-readable medium of claim 15, wherein the session identifier is obtained and used by a second node in the plurality of nodes in the system.

17. The computer-readable medium of claim 15, wherein searching said at least one earlier generation includes sequentially searching earlier generation hash maps from the currently valid hash map back through previous generations of hash maps until the session state data is located.

18. The computer-readable medium of claim 16, wherein the second node is currently delivering another session to another client device and further comprising storing session state data for said another session using the currently valid hash map.

19. The computer-readable medium of claim 15, wherein previous generations of the hash map expire and no longer need to searched after expiration of a time-to-live (TTL) for any stored session state data.

20. The computer-readable medium of claim 15, wherein the system is a system for delivering ABR streaming content to the client device, each of the nodes of the system including an instance of a manifest manipulator delivering ABR manifests to the client device, wherein the service being delivered to the client device includes delivery of ABR streaming content to the client device.

* * * * *